US012002360B2

(12) United States Patent
Lu et al.

(10) Patent No.: US 12,002,360 B2
(45) Date of Patent: Jun. 4, 2024

(54) METHOD AND APPARATUS FOR ADJUSTING TRAIN DIAGRAM

(71) Applicant: Traffic Control Technology Co., Ltd, Beijing (CN)

(72) Inventors: Kai Lu, Beijing (CN); Ming Luo, Beijing (CN); Xingdong Zhao, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 365 days.

(21) Appl. No.: 17/563,096

(22) Filed: Dec. 28, 2021

(65) Prior Publication Data

US 2023/0017198 A1 Jan. 19, 2023

(30) Foreign Application Priority Data

Jul. 19, 2021 (CN) ......................... 202110815752.3

(51) Int. Cl.
*G08G 1/13* (2006.01)
*G06Q 50/40* (2024.01)

(52) U.S. Cl.
CPC ............... *G08G 1/13* (2013.01); *G06Q 50/40* (2024.01)

(58) Field of Classification Search
CPC ........... G08G 1/13; G06Q 50/30; B61L 27/12
See application file for complete search history.

(56) References Cited

U.S. PATENT DOCUMENTS

2016/0005310 A1* 1/2016 Takao ...................... G08G 1/00 701/117

FOREIGN PATENT DOCUMENTS

| | | | |
|---|---|---|---|
| CN | 101920710 | A | 12/2010 |
| CN | 103241268 | A | 8/2013 |
| CN | 105128894 | A | 12/2015 |
| CN | 109034566 | A | 12/2018 |
| CN | 109993964 | A | 7/2019 |
| CN | 110304117 | A | 10/2019 |
| CN | 110414766 | A | 11/2019 |
| CN | 110450825 | A | 11/2019 |
| CN | 111055891 | A | 4/2020 |
| CN | 111709562 | A | 9/2020 |
| CN | 111754757 | A | 10/2020 |
| CN | 111845869 | A | 10/2020 |
| CN | 112863166 | A | 5/2021 |
| CN | 111055891 | B | 9/2021 |

(Continued)

OTHER PUBLICATIONS

The extended European search report for European Application No. 21218260.4, dated Jul. 7, 2022, 11 pages.

(Continued)

*Primary Examiner* — Yuen Wong
(74) *Attorney, Agent, or Firm* — East IP P.C.

(57) ABSTRACT

The present application discloses a method and apparatus for adjusting a train diagram, the method includes: obtaining a first time of an extra train corresponding to a target passenger flow, and obtaining a set of trains with adjustable departure times based on the first time, in which the set of trains includes at least one train; adjusting a departure time of the at least one train in the set of trains based on a preset minimum departure time interval to obtain an adjusted train diagram; and performing an extra train adding instruction based on the adjusted train diagram.

12 Claims, 4 Drawing Sheets

(56) References Cited

FOREIGN PATENT DOCUMENTS

| | | | |
|---|---|---|---|
| JP | 3443453 | B2 | 9/2003 |
| JP | 2013023080 | A | 2/2013 |
| WO | 2015008318 | A1 | 1/2015 |

OTHER PUBLICATIONS

The Grant Notification for Chinese Application No. 2021108 15752.3, dated Aug. 15, 2022, 7 pages.

Lu, Kai, Optimal Strategy Based Passenger Simulation and Behavior Inference for Urban Rail Transit Network, Jan. 15, 2020, 171 pages.

XU han. "The Adding Train Paths Theories and Methods on Cyclic Timetable Based on Flexible Connection", Beijing Jiaotong University, dated Mar. 2018, 96 pages.

* cited by examiner

METHOD AND APPARATUS FOR ADJUSTING TRAIN DIAGRAM

CROSS REFERENCE TO RELATED APPLICATION

The present application claims the benefit of priority to Chinese Patent Application No. 202110815752.3 filed on Jul. 19, 2021 and titled "METHOD AND APPARATUS FOR ADJUSTING TRAIN DIAGRAM", which is incorporated herein by reference in its entirety.

TECHNICAL FIELD

The present application relates to the technical field of rail transit, and particularly to a method and apparatus for adjusting a train diagram.

BACKGROUND

The passenger flow of rail transit is the basic data for formulating train operation plans and making dispatching decisions. In a scenario with a large passenger flow of rail transit, adding extra trains is an effective way for adjusting the train diagram.

In the related technologies, adjusting the train diagram by adding extra trains is fulfilled by the dispatcher through manually drawing the train diagram and informing the train drivers, which is less automatic and error-prone, and such adding of extra trains is relatively subjective without an objective evaluation of the train diagram.

In sum, the adjusting the train diagram by adding extra trains in the related technologies is less automatic and error-prone, which should be solved urgently.

SUMMARY

The present application provides a method and apparatus for adjusting a train diagram.

In the first aspect, the present application provides a method for adjusting a train diagram, comprising:

obtaining a first time of an extra train corresponding to a target passenger flow, and obtaining a set of trains with adjustable departure times based on the first time, wherein the set of trains comprises at least one train;

adjusting a departure time of the at least one train in the set of trains based on a preset minimum departure time interval to obtain an adjusted train diagram; and performing an extra train adding instruction based on the adjusted train diagram.

Optionally, the set of trains comprises a first set of trains and a second set of trains, the first set of trains comprises at least one train with a departure time before the first time, and the second set of trains comprises at least one train with a departure time after the first time; adjusting the departure time of the at least one train in the set of trains based on the preset minimum departure time interval comprises:

sorting the at least one train in the first set of trains in an order of departure time from back to front to obtain a sorted first set of trains $\{Sb_1, \ldots, Sb_i, \ldots, Sb_n\}$, wherein $1 \leq i \leq n$, and i is an integer;

determining whether a difference between the first time and a departure time of a train $Sb_1$ is greater than or equal to the preset minimum departure time interval;

under a condition that the difference between the first time and the departure time of the train $Sb_1$ is greater than or equal to the preset minimum departure time interval, adjusting the departure time of the at least one train in the second set of trains based on the preset minimum departure time interval; and under a condition that the difference between the first time and the departure time of the train $Sb_1$ is less than the preset minimum departure time interval, adjusting the departure time of the at least one train in the sorted first set of trains in sequence based on a preset minimum turn-back time of train.

Optionally, adjusting the departure time of the at least one train in the sorted first set of trains in sequence based on the preset minimum turn-back time of train comprises: each time a departure time of a train Sb is adjusted, determining whether an adjusted departure time of the train Sb satisfies a first preset condition;

under a condition that the adjusted departure time of the train $Sb_i$ satisfies the first preset condition, stopping adjusting the departure time of the at least one train in the sorted first set of trains, and determining whether a difference between the first time and the adjusted departure time of the train $Sb_1$ is greater than or equal to the preset minimum departure time interval; and under a condition that the adjusted departure time of the train $Sb_i$ does not satisfy the first preset condition, proceeding to adjust a departure time of a train $Sb_{i+1}$ in the first set of trains; wherein the first preset condition is: $t'_{sbi}-t_{sbi+1} \geq I$ and $t'_{sbi-1}-t'_{sbi} \geq I$, $t'_{sbi-1}$ represents an adjusted departure time of a train $Sb_{i-1}$, $t'_{sbi}$ represents the adjusted departure time of the train $Sb_i$, I represents the preset minimum departure time interval, and $t_{sbi+1}$ represents the departure time of the train $Sb_{i+1}$.

Optionally, after determining whether the adjusted departure time of the train $Sb_i$ satisfies the first preset condition, the method further comprises:

under a condition that a difference between an adjusted departure time of a train $Sb_{n-1}$ and an adjusted departure time of a train $Sb_n$ is less than the preset minimum departure time interval, adjusting the first time based on the preset minimum departure time interval without adjusting departure times of all trains in the sorted first set of trains.

Optionally, after determining whether the difference between the first time and the adjusted departure time of the train $Sb_1$ is greater than or equal to the preset minimum departure time interval, the method further comprises:

under a condition that the difference between the first time and the adjusted departure time of the train $Sb_1$ is greater than or equal to the preset minimum departure time interval, adjusting the departure time of the at least one train in the second set of trains based on the preset minimum departure time interval; and under a condition that the difference between the first time and the adjusted departure time of the train $Sb_1$ is less than the preset minimum departure time interval, adjusting the first time based on the preset minimum departure time interval.

Optionally, adjusting the first time based on the preset minimum departure time interval comprises:

sorting the at least one train in the second set of trains in an order of departure time from front to back to obtain a sorted second set of trains $\{Sa_1, \ldots, Sa_i, \ldots, Sa_n\}$, wherein $1 \leq i \leq n$, and i is an integer;

determining whether a difference between a departure time of a train $Sa_1$ and the departure time of the train $Sb_1$ is greater than or equal to twice the preset minimum departure time interval, or determining whether a difference between the departure time of the train $Sa_1$ and the adjusted departure time of the train $Sb_1$ is greater than or equal to twice the preset minimum departure time interval; and under a condition that the difference between the departure time of the train $Sa_1$ and the departure time of the train $Sb_1$ is greater than or equal to twice the preset minimum departure time interval, or it is determined that the difference between the departure time of the train $Sa_1$ and the adjusted departure time of the train $Sb_1$ is greater than or equal to twice the preset minimum departure time interval, adjusting the first time based on the preset minimum departure time interval, and terminating the adjusting.

Optionally, the method further comprises:

under a condition that the difference between the departure time of the train $Sa_1$ and the departure time of the train $Sb_1$ is less than twice the preset minimum departure time interval, or it is determined that the difference between the departure time of the train $Sa_1$ and the adjusted departure time of the train $Sb_1$ is less than twice the preset minimum departure time interval, adjusting the departure time of the at least one train in the sorted second set of trains based on the preset minimum departure time interval;

wherein adjusting the departure time of the at least one train in the sorted second set of trains based on the preset minimum departure time interval comprises:

calculating a first adjustment time of the train $Sa_1$ based on the preset minimum departure time interval, determining an adjusted departure time of the train $Sa_1$ based on the first adjustment time of the train $Sa_1$, and adjusting the first time based on the adjusted departure time of the train $Sa_1$; and adjusting the departure time of the at least one train in the sorted second set of trains in sequence based on the adjusted departure time of the train $Sa_1$.

Optionally, adjusting the departure time of the at least one train in the second set of trains based on the preset minimum departure time interval comprises: sorting the at least one train in the second set of trains in an order of departure time from front to back to obtain a sorted second set of trains $\{Sa_1, \ldots, Sa_i, \ldots, Sa_n\}$, wherein $1 \leq i \leq n$, and i is an integer;

determining whether a difference between a departure time of a train $Sa_1$ and the first time is greater than or equal to the preset minimum departure time interval;

under a condition that the difference between the departure time of the train $Sa_1$ and the first time is greater than or equal to the preset minimum departure time interval, terminating the adjusting; and under a condition that the difference between the departure time of the train $Sa_1$ and the first time is less than the preset minimum departure time interval, adjusting the departure time of the at least one train in the sorted second set of trains.

Optionally, adjusting the departure time of the at least one train in the sorted second set of trains comprises:

calculating a second adjustment time of the train $Sa_1$ based on the preset minimum departure time interval;

determining an adjusted departure time of the train $Sa_1$ based on the second adjustment time, and adjusting the first time based on the adjusted departure time of the train $Sa_1$; and adjusting the departure time of the at least one train in the sorted second set of trains in sequence based on the adjusted departure time of the train $Sa_1$.

Optionally, adjusting the departure time of the at least one train in the sorted second set of trains in sequence based on the adjusted departure time of the train $Sa_1$ comprises: determining whether a difference between an adjusted departure time of a train $Sa_i$ and a departure time of a train $Sa_{i+1}$ is greater than or equal to the preset minimum departure time interval;

under a condition that the difference between the adjusted departure time of the train $Sa_i$ and the departure time of the train $Sa_{i+1}$ is greater than or equal to the preset minimum departure time interval, terminating the adjusting; and under a condition that the difference between the adjusted departure time of the train $Sa_i$ and the departure time of the train $Sa_{i+1}$ is less than the preset minimum departure time interval, adjusting the departure time of the train $Sa_{i+1}$.

In the second aspect, the present application provides an apparatus for adjusting a train diagram, comprising:

an obtaining unit configured to obtain a first time of an extra train corresponding to a target passenger flow and obtain a set of trains with adjustable departure times based on the first time, wherein the set of trains comprises at least one train;

an adjusting unit configured to adjust a departure time of the at least one train in the set of trains based on a preset minimum departure time interval to obtain an adjusted train diagram; and a performing unit configured to perform an extra train adding instruction based on the adjusted train diagram.

In the third aspect, the present application further provides an electronic device comprising a memory, a processor, and a computer program stored in the memory and capable of running on the processor, wherein the processor, when performing the computer program, implements steps of the method for adjusting a train diagram of the first aspect.

In the fifth aspect, the present application further provides a non-transitory computer readable storage medium storing a computer program thereon which, when performed by a processor, implements steps of the method for adjusting a train diagram of the first aspect.

BRIEF DESCRIPTION OF THE DRAWINGS

In order to more clearly illustrate the technical solutions of the present application or the prior art, the drawings needed in the description of the embodiments or the prior art will be briefly introduced in the following. Obviously, the drawings in the following description are some of the embodiments of the present application, and for those of ordinary skill in the art, other drawings can be obtained based on these drawings without creative work.

DETAILED DESCRIPTION

In order to make the objectives, technical solutions, and advantages of the present application clearer, the technical solutions of the present application will be described clearly and completely in conjunction with the accompanying drawings. Obviously, the described embodiments are part, rather than all, of the embodiments of the present application. Based on the embodiments of the present application, all other embodiments obtained by those of ordinary skill in the art without creative work shall fall within the protection scope of the present application.

Figure 1:
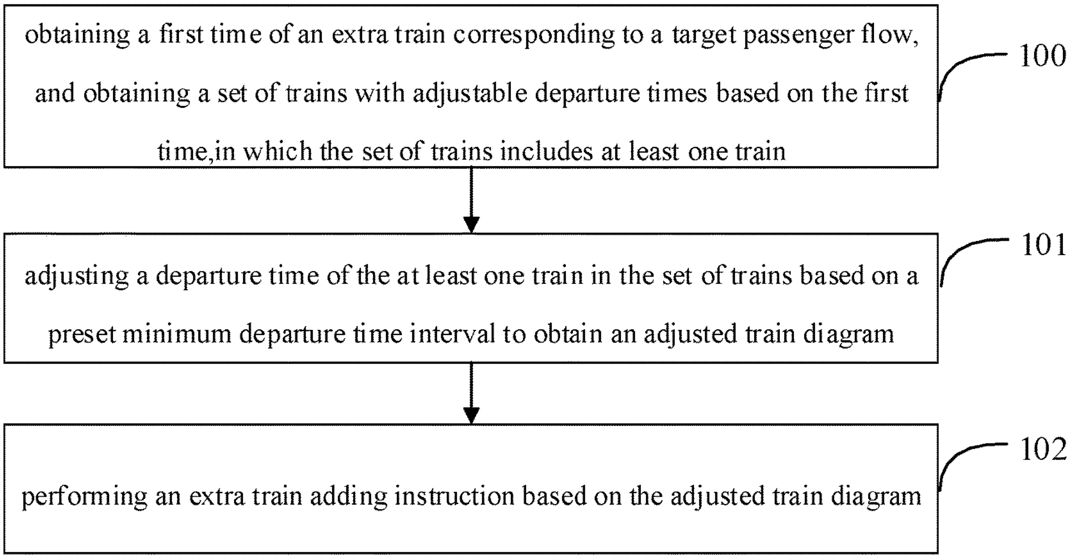
FIG. 1 shows a schematic flow diagram of a method for adjusting a train diagram provided by the present application.

In order to solve the problem that the adjusting the train diagram by adding extra trains in the related technologies is less automatic and error-prone, the present application provides a method for adjusting a train diagram, and FIG. 1 shows a schematic flow diagram of a method for adjusting a train diagram provided by the embodiments of the present application. As shown in FIG. 1, the method includes the following steps.

Step 100: obtaining a first time of an extra train corresponding to a target passenger flow, and obtaining a set of trains with adjustable departure times based on the first time, in which the set of trains includes at least one train.

The target passenger flow is an application scenario for a large passenger flow.

The extra train is a train added if the target passenger flow occurs.

The first time is a departure time of the extra train.

Herein, the initial value of the first time is the time when the extra train arrives at the departure station after receiving the extra train adding instruction.

The set of trains with adjustable departure times represents at least one train in the departure station that has not departed when the target passenger flow occurs.

Optionally, the set of trains with adjustable departure times includes a first set of trains, a second set of trains and the extra train.

Herein, the first set of trains includes at least one train with a departure time before the first time.

The second set of trains includes at least one train with a departure time after the first time. For example, the second set of trains includes no more than 10 trains.

In an implementation, the first time of the extra train corresponding to the target passenger flow is obtained, and the set of trains with adjustable departure times is obtained based on the first time, in which the set of trains includes the first set of trains and the second set of trains, the first set of trains includes at least one train with a departure time before the first time, and the second set of trains includes at least one train with a departure time after the first time.

Step 101: adjusting a departure time of the at least one train in the set of trains based on a preset minimum departure time interval to obtain an adjusted train diagram.

The preset minimum departure time interval represents the minimum difference between the departure times of two adjacent trains.

The train diagram represents the technical documents of the running of the train in a track section and the arrival time, departure time or passing time of the train at each station.

In an implementation, the departure time of the at least one train in the first set of trains and the departure time of the at least one train in the second set of trains are respectively adjusted based on the preset minimum departure time interval to obtain the adjusted train diagram.

Step 102: performing an extra train adding instruction based on the adjusted train diagram.

The extra train adding instruction presents an instruction for adding a train if the target passenger flow occurs.

In an implementation, the extra train adding instruction is performed based on the adjusted train diagram when the target passenger flow occurs.

In an embodiment, after the extra train adding instruction is performed, the running time of the extra train is determined based on the current time. If the current time is at peak time, such as 9 am, the extra train will continue to run after it runs for one lap. If the current time is at off-peak time, such as 2 pm, the extra train will be out of service after it runs for one lap.

According to the method for adjusting a train diagram provided by the embodiments of the present application, the first time of the extra train corresponding to the target passenger flow is obtained, and the set of trains with adjustable departure times is obtained based on the first time, the departure time of the at least one train in the set of trains is adjusted based on the preset minimum departure time interval to obtain the adjusted train diagram, and the extra train adding instruction is performed based on the adjusted train diagram, so that a one-button extra train adding function can be realized in the scenario with a large passenger flow, the work intensity of the staff is reduced, and the automation level is improved.

Optionally, the method further includes pushing the adjusted train diagram to a parallel deduction system to obtain index data, and evaluating the adjusted train diagram based on the index data.

In order to solve the problem that the adding of extra trains in the related technologies is relatively subjective without an objective evaluation of the train diagram, the adjusted train diagram is input to the parallel deduction system to obtain index data, and the adjusted train diagram is evaluated based on the index data.

The parallel deduction system is configured to perform deduction based on the adjusted train diagram if the target passenger flow occurs, determine the influence of the adjusted train diagram on the train operation, passenger flow and train flow of the target line, and output the index data.

Optionally, the index data includes train operation index data, passenger flow index data and energy consumption index data.

In an implementation, the adjusted train diagram is input to the parallel deduction system to output the index data, and the operation adjustment effect of the adjusted train diagram is obtained according to the index data as the evaluation result of the adjusted train diagram.

According to the method for adjusting the train diagram provided by the embodiments of the present application, the adjusted train diagram is pushed to the parallel deduction system to obtain the index data and the adjusted train diagram is evaluated based on the index data, so that the scenario in which the target passenger flow occurs can be deduced and the adjusted train diagram can be evaluated objectively, the reliability of the adjusted train diagram is improved.

Figure 2:
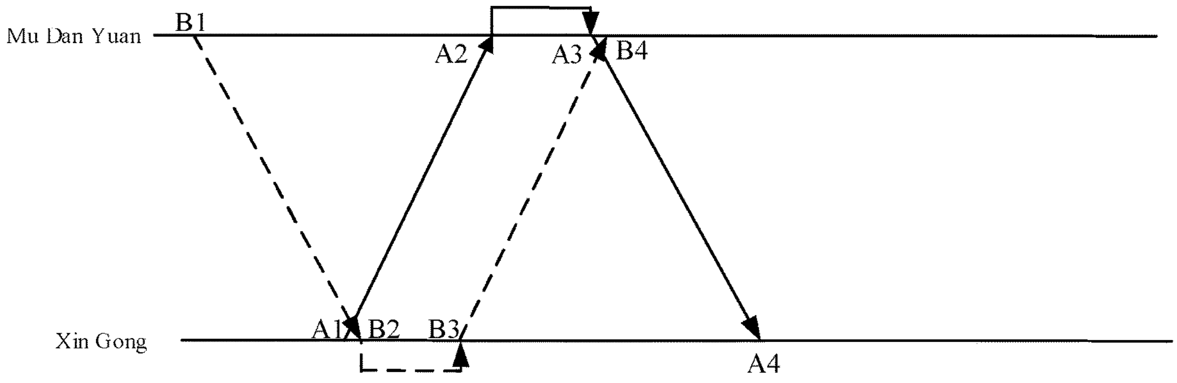
FIG. 2 shows a schematic diagram of a train diagram provided by the present application.

Constitutions of the train diagram is further illustrated below with an example. FIG. 2 shows a schematic diagram of a train diagram provided by the embodiments of the present application.

As shown in FIG. 2, the train diagram includes Xin Gong as the starting station and Mu Dan Yuan as the final station, and it is assumed that the direction from Xin Gong to the Mu Dan Yuan is the up direction and the direction from Mu Dan Yuan to Xin Gong is the down direction.

As shown in FIG. 2, the train runs from B1 to B2 and then from B3 to B4, which means that the train turns from the down direction to the up direction, in which a time from B2 to B3 represents the actual up turn-back time of train.

As shown in FIG. 2, the train runs from A1 to A2 and then from A3 to A4, which means that the train turns from the up direction to the down direction, in which a time from A2 to A3 represents the actual down turn-back time of train.

Based on the above embodiments, the set of trains includes a first set of trains and a second set of trains, in which the first set of trains includes at least one train with a departure time before the first time, and the second set of trains includes at least one train with a departure time after the first time;

adjusting the departure time of the at least one train in the set of trains based on the preset minimum departure time interval includes:

sorting the at least one train in the first set of trains in an order of departure time from back to front to obtain a sorted first set of trains $\{Sb_1, \ldots, Sb_i, \ldots, Sb_n\}$, in which $1 \le i \le n$, and i is an integer;

determining whether a difference between the first time and a departure time of a train $Sb_1$ is greater than or equal to the preset minimum departure time interval;

under a condition that the difference between the first time and the departure time of the train $Sb_1$ is greater than or equal to the preset minimum departure time interval, adjusting the departure time of the at least one train in the second set of trains based on the preset minimum departure time interval; and under a condition that the difference between the first time and the departure time of the train $Sb_1$ is less than the preset minimum departure time interval, adjusting the departure time of the at least one train in the sorted first set of trains in sequence based on a preset minimum turn-back time of train.

It should be noted that, in order to ensure the rationality of the adjusted train diagram, it is necessary to determine whether the difference between the first time and the departure time of the train $Sb_1$ satisfies the preset minimum departure time interval, and respectively adjust the departure time of the at least one train in the first set of trains and the departure time of the at least one train in the second set of trains according to the result of the determining.

If the preset minimum departure time interval is not satisfied, the departure time of the at least one train in the first set of trains is first adjusted, and then the departure time of the at least one train in the second set of trains is adjusted.

If the preset minimum departure time interval is satisfied, it indicates that all the differences between departure times of adjacent trains in the first set of trains satisfy the preset minimum departure time interval, and only the departure time of the at least one train in the second set of trains needs to be adjusted.

The preset minimum turn-back time of train includes a preset up minimum turn-back time of train and a preset down minimum turn-back time of train.

The preset up minimum turn-back time of train presents the minimum value of the actual up turn-back time of train when the train turns from the down direction to the up direction.

The preset down minimum turn-back time of train presents the minimum value of the actual down turn-back time of train when the train turns from the up direction to the down direction.

The departure time of the at least one train in the sorted first set of trains is adjusted in sequence means that the departure time of the at least one train in the first set of trains is adjusted according to the sort order of the trains in the first set of trains.

According to the method for adjusting a train diagram provided by the embodiments of the present application, it is determined whether the difference between the first time and the departure time of the train $Sb_1$ satisfies the preset minimum departure time interval, the departure time of the at least one train in the first set of trains and the departure time of the at least one train in the second set of trains are respectively adjusted based on the result of the determining, and then the adjusted train diagram is obtained, so that a one-button extra train adding function can be realized in the scenario with a large passenger flow, the work intensity of the staff is reduced, and the automation level is improved.

Based on the above embodiments, adjusting the departure time of the at least one train in the sorted first set of trains in sequence based on the preset minimum turn-back time of train includes:

each time a departure time of a train $Sb_i$ is adjusted, determining whether an adjusted departure time of the train $Sb_i$ satisfies a first preset condition;

under a condition that the adjusted departure time of the train $Sb_i$ satisfies the first preset condition, stopping adjusting the departure time of the at least one train in the sorted first set of trains, and determining whether a difference between the first time and the adjusted departure time of the train $Sb_1$ is greater than or equal to the preset minimum departure time interval; and under a condition that the adjusted departure time of the train $Sb_i$ does not satisfy the first preset condition, proceeding to adjust a departure time of a train $Sb_{i+1}$ in the first set of trains; in which the first preset condition is: $t'_{sbi} - t_{sbi+1} \ge I$ and $t'_{sbi-1} - t_{sbi} \ge I$, $t_{sbi-1}$ represents an adjusted departure time of a train $Sb_{i-1}$, $t'_{sbi}$ represents the adjusted departure time of the train $Sb_i$, I represents the preset minimum departure time interval, and $t_{sbi+1}$ represents the departure time of the train $Sb_{i+1}$.

It should be noted that the adjusting of the departure time of the at least one train in the sorted first set of trains includes three situations: the first is to adjust the departure times of all the trains in the first set of trains; the second is to adjust the departure times of part of the trains in the first set of trains; and the third is not to adjust the departure times of all the trains in the first set of trains.

The specific process for adjusting the departure time of the at least one train in the sorted first set of trains is described in conjunction with the following instance.

For example, after the departure time of the train $Sb_1$ is adjusted, it is determined whether a difference between the adjusted departure time of the train $Sb_1$ and a departure time of a train $Sb_2$ is greater than or equal to the preset minimum departure time interval, if yes, the adjusting for the departure time of the at least one train in the first set of trains is stopped; and if no, the departure time of the train $Sb_2$ is adjusted, then it is further determined whether a difference between a departure time of a train $Sb_3$ and the adjusted departure time of the train $Sb_2$ is greater than or equal to the preset minimum departure time interval, or it is determined whether a difference between the adjusted departure time of the train $Sb_2$ and the adjusted departure time of the train $Sb_1$ is greater than or equal to the preset minimum departure time interval, until the adjusting for the departure time of the at least one train in the first set of trains is stopped or the departure times of all the trains in the first set of trains have been adjusted.

In an implementation, adjusting the departure time of the train $Sb_i$ includes: adjusting the departure time of the train $Sb_i$ using Equation (1):

$$t'_{sbi}=t_{sbi}-(T_{urn}-T_{u\ min}) \quad (1)$$

in which $t'_{sbi}$ represents the adjusted departure time of the train $Sb_i$, $t_{sbi}$ represents the departure time of the train $Sb_i$, $T_{urn}$ represents the actual turn-back time of train, and $T_{u\ min}$ represents the preset minimum turn-back time of train.

According to the method for adjusting a train diagram provided by the embodiments of the present application, the departure time of the at least one train in the sorted first set of trains is adjusted in sequence based on the preset minimum turn-back time of train, each time the departure time of the train $Sb_i$ is adjusted, it is determined whether the adjusted departure time of the train $Sb_i$ satisfies the first preset condition, the departure time of the at least one train in the first set of trains is adjusted based on the result of the determining, and then the train diagram is adjusted, so that a one-button extra train adding function can be realized in the scenario with a large passenger flow, the work intensity of the staff is reduced, and the automation level is improved.

Based on the above embodiments, after determining whether the adjusted departure time of the train $Sb_i$ satisfies the first preset condition, the method further includes: under a condition that a difference between an adjusted departure time of a train $Sb_{n-1}$ and an adjusted departure time of a train $Sb_n$ is less than the preset minimum departure time interval, adjusting the first time based on the preset minimum departure time interval without adjusting departure times of all trains in the sorted first set of trains.

It should be noted that under a condition that the difference between the adjusted departure time of the train $Sb_{n-1}$ and the adjusted departure time of the train Sb is less than the preset minimum departure time interval, it indicates that a train is added if the target passenger flow occurs and the departure times of all the trains in the first set of trains cannot be adjusted, therefore, only the first time of the extra train corresponding to the target passenger flow can be adjusted.

According to the method for adjusting a train diagram provided by the embodiments of the present application, under a condition that the departure times of all the trains in the sorted first set of trains cannot be adjusted, the first time of the extra train corresponding to the target passenger flow is adjusted, and the departure time of the at least one train in the second set of trains is adjusted based on the first time, and then the train diagram is adjusted, so that a one-button extra train adding function can be realized in the scenario with a large passenger flow, the work intensity of the staff is reduced, and the automation level is improved.

Figure 3:
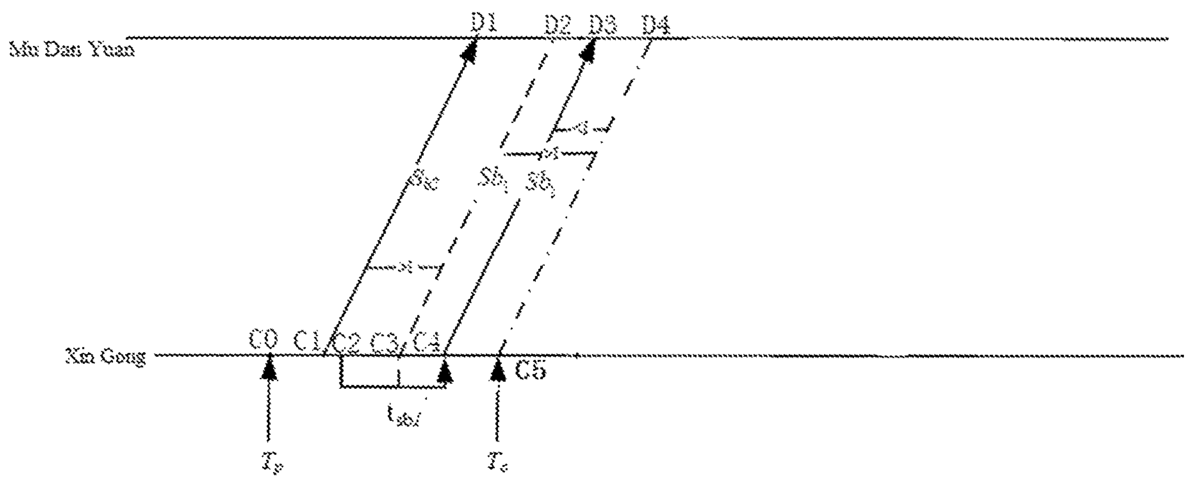
FIG. 3 shows a schematic scenario diagram of a method for adjusting a train diagram provided by the present application.

The process for adjusting the departure time of the at least one train in the first set of trains is specifically described with reference to FIG. 3. FIG. 3 shows a schematic scenario diagram of a method for adjusting a train diagram provided by the embodiments of the present application.

As shown in FIG. 3, if the target passenger flow occurs, an extra train is added for the target passenger flow C0 represents the time node $T_p$ of a train with an adjustable departure time, the segment from C5 to D4 represents the first time $T_0$ of the extra train, in which $T_p=t_0+t_1+t_2$, the initial value of $T_0$ is $t_0+t_1+t_2+t_3+t_4$, $t_0$ represents the time when the target passenger flow occurs, $t_1$ represents the time when the adjusted train diagram is generate if the target passenger flow occurs, $t_2$ represents the time to when an extra train adding instruction is performed, $t_3$ represents the train preparation time, and $t_4$ represents the time when the extra train arrives at the starting station after receiving the instruction.

The current train diagram includes the first set of trains which includes a train $Sb_1$ and a train $Sb_2$, Xin Gong represents the starting station, Mu Dan Yuan represents the final station, the segment from C1 to D1 represents the departure time of the train $Sb_2$, the segment from C2 to C4 represents the actual up turn-back time of train $T_{urn}$, and the segment from C4 to D3 represents the departure time $t_{sb1}$ of the train $Sb_1$.

As shown in FIG. 3, under a condition that $T_0-t_{sb1}<I$, the departure time of the train $Sb_1$ is adjusted, including adjusting the actual up turn-back time of train $T_{urn}$ to obtain the adjusted departure time $t'_{sb1}$ of the train $Sb_1$, in which I represents the preset minimum departure time interval.

After the departure time of the train $Sb_1$ is adjusted, under a condition that $t'_{sb1}-t_{sb2}\geq I$, the departure time of the train $Sb_2$ is not adjusted, and the adjusting is terminated.

As shown in FIG. 3, the adjusted train diagram includes the first set of trains which includes the train $Sb_1$ and the train $Sb_2$, in which the segment from C2 to C3 represents the adjusted actual up turn-back time of train $T'_{urn}$, and the segment from C3 to D2 represents the adjusted departure time $t'_{sb1}$ of the train $Sb_1$.

Based on the above embodiments, after determining whether the difference between the first time and the adjusted departure time of the train $Sb_1$ is greater than or equal to the preset minimum departure time interval, the method further includes:

- under a condition that the difference between the first time and the adjusted departure time of the train $Sb_1$ is greater than or equal to the preset minimum departure time interval, adjusting the departure time of the at least one train in the second set of trains based on the preset minimum departure time interval; and
- under a condition that the difference between the first time and the adjusted departure time of the train $Sb_1$ is less than the preset minimum departure time interval, adjusting the first time based on the preset minimum departure time interval.

It should be noted that, after the adjusting of the departure time of the at least one train in the sorted first set of trains is stopped, it should be further determined whether the difference between the first time and the adjusted departure time of the train $Sb_1$ is greater than or equal to the preset minimum departure time interval, so as to further adjust the first time or the departure time of the at least one train in the second set of trains.

Herein, under a condition that the difference between the first time and the adjusted departure time of the train $Sb_1$ is greater than or equal to the preset minimum departure time interval, the departure time of the at least one train in the second set of trains is adjusted.

Under a condition that the difference between the first time and the adjusted departure time of the train $Sb_1$ is less than the preset minimum departure time interval, the first time is adjusted.

According to the method for adjusting a train diagram provided by the embodiments of the present application, it is determined whether the difference between the first time and the adjusted departure time of the train $Sb_1$ is greater than or equal to the preset minimum departure time interval, the first time or the departure time of the at least one train in the second set of trains is adjusted based on the result of the determining, and then the train diagram is adjusted, so that a one-button extra train adding function can be realized in the scenario with a large passenger flow, the work intensity of the staff is reduced, and the automation level is improved.

Based on the above embodiments, adjusting the first time based on the preset minimum departure time interval includes:

sorting the at least one train in the second set of trains in an order of departure time from front to back to obtain a sorted second set of trains $\{Sa_1, \ldots, Sa_i, \ldots, Sa_n\}$, in which $1 \leq i \leq n$, and i is an integer;

determining whether a difference between a departure time of a train $Sa_1$ and the departure time of the train $Sb_1$ is greater than or equal to twice the preset minimum departure time interval, or determining whether a difference between the departure time of the train $Sa_1$ and the adjusted departure time of the train $Sb_1$ is greater than or equal to twice the preset minimum departure time interval; and under a condition that the difference between the departure time of the train $Sa_1$ and the departure time of the train $Sb_1$ is greater than or equal to twice the preset minimum departure time interval, or it is determined that the difference between the departure time of the train $Sa_1$ and the adjusted departure time of the train $Sb_1$ is greater than or equal to twice the preset minimum departure time interval, adjusting the first time based on the preset minimum departure time interval, and terminating the adjusting.

It should be noted that the adjusting of the first time includes two situations: one is to directly adjust the first time and the adjusting is terminated; and the other is to first adjust the departure time of the at least one train in the sorted second set of trains, and then to adjust the first time based on the adjusted departure time of the train $Sa_1$.

In an implementation, adjusting the first time based on the preset minimum departure time interval includes:

adjusting the first time based on the preset minimum departure time interval using Equations (2) or (3):

$$T'_0=t_{sb1}+I \tag{2}$$

$$T'_0=t'_{sb1}+I \tag{3}$$

in which $T'_0$ represents the adjusted first time, $t_{sb1}$ represents the departure time of the train $Sb_1$, $t'_{sb1}$ represents the adjusted departure time of the train $Sb_1$, and I represents the preset minimum departure time interval.

According to the method for adjusting a train diagram provided by the embodiments of the present application, it is determined whether the difference between the departure time of the train $Sa_1$ and the departure time of the train $Sb_1$ is greater than or equal to twice the preset minimum departure time interval, or it is determined whether the difference between the departure time of the train $Sa_1$ and the adjusted departure time of the train $Sb_1$ is greater than or equal to twice the preset minimum departure time interval, the first time is adjusted based on the result of the determining, and then the train diagram is adjusted, so that a one-button extra train adding function can be realized in the scenario with a large passenger flow, the work intensity of the staff is reduced, and the automation level is improved.

Based on the above embodiments, the method further includes:

under a condition that the difference between the departure time of the train $Sa_1$ and the departure time of the train $Sb_1$ is less than twice the preset minimum departure time interval, or it is determined that the difference between the departure time of the train $Sa_1$ and the adjusted departure time of the train $Sb_1$ is less than twice the preset minimum departure time interval, adjusting the departure time of the at least one train in the sorted second set of trains based on the preset minimum departure time interval;

in which adjusting the departure time of the at least one train in the sorted second set of trains based on the preset minimum departure time interval includes:

calculating a first adjustment time of the train $Sa_1$ based on the preset minimum departure time interval, determining an adjusted departure time of the train $Sa_1$ based on the first adjustment time of the train $Sa_1$, and adjusting the first time based on the adjusted departure time of the train $Sa_1$; and adjusting the departure time of the at least one train in the sorted second set of trains in sequence based on the adjusted departure time of the train $Sa_1$.

It should be noted that the process of adjusting the departure time of the at least one train in the sorted second set of trains includes: first determining the adjusted departure time of the train $Sa_1$, and then adjusting the departure time of the at least one train in the sorted second set of trains in sequence based on the adjusted departure time of the train $Sa_1$.

In an implementation, calculating the first adjustment time of the train $Sa_1$ based on the preset minimum departure time interval includes:

calculating the first adjustment time of the train $Sa_1$ based on the preset minimum departure time interval using Equations (4) or (5):

$$t_{ad}=2I-t_{sb1} \tag{4}$$

$$t_{ad}=2I-t'_{sb1} \tag{5}$$

in which $t_{ad}$ represents the first adjustment time, I represents the preset minimum departure time interval, $t_{sb1}$ represents the departure time of the train $Sb_1$, and $t'_{sb1}$ represents the adjusted departure time of the train $Sb_1$.

In an implementation, an adjusted departure time of the train $Sa_1$ is determined based on the first adjustment time of the train $Sa_1$ using Equations (6)-(7):

$$N=\lceil t_{ad}/(T_{urn}-T_{u\ min})\rceil \tag{6}$$

$$t'_{sa1}=t_{sa1}+N*(T_{urn}-T_{u\ min}) \tag{7}$$

in which $t_{ad}$ represents the first adjustment time, N represents the number of train turn-backs, $T_{urn}$ represents the actual turn-back time of train, $T_{u\ min}$ represents the preset minimum turn-back time of train, $t_{sa1}$ represents the departure time of the train $Sa_1$, and $t'_{sa1}$ represents the adjusted departure time of the train $Sa_1$.

In an implementation, adjusting the first time based on the adjusted departure time of the train $Sa_1$ includes:

calculating the adjusted first time based on the adjusted departure time of the train $Sa_1$ using Equation (8):

$$T'_0=t'_{sa1}-I \tag{8}$$

in which $T'_0$ represents the adjusted first time, $t'_{sa1}$ represents the adjusted departure time of the train $Sa_1$, and I represents the preset minimum departure time interval.

The departure time of the at least one train in the sorted second set of trains is adjusted in sequence means that the departure time of the at least one train in the second set of trains is adjusted according to the sort order of the trains in the second set of trains.

According to the method for adjusting a train diagram provided by the embodiments of the present application, the adjusted departure time of the train $Sa_1$ is first calculated, then the first time is adjusted based on the adjusted departure time of the train $Sa_1$, and the departure time of the at least one train in the sorted second set of trains is adjusted in sequence based on the adjusted departure time of the train $Sa_1$, and then the train diagram is adjusted, so that a one-button extra train adding function can be realized in the scenario with a large passenger flow, the work intensity of the staff is reduced, and the automation level is improved.

Based on the above embodiments, adjusting the departure time of the at least one train in the second set of trains based on the preset minimum departure time interval includes: sorting the at least one train in the second set of trains in an order of departure time from front to back to obtain a sorted second set of trains $\{Sa_1, \ldots, Sa_i, \ldots, Sa_n\}$, in which $1 \leq i \leq n$, and i is an integer;

- determining whether a difference between a departure time of a train $Sa_1$ and the first time is greater than or equal to the preset minimum departure time interval;
- under a condition that the difference between the departure time of the train $Sa_1$ and the first time is greater than or equal to the preset minimum departure time interval, terminating the adjusting; and
- under a condition that the difference between the departure time of the train $Sa_1$ and the first time is less than the preset minimum departure time interval, adjusting the departure time of the at least one train in the sorted second set of trains.

It should be noted that the adjusting of the departure time of the at least one train in the second set of trains includes three situations: the first is not to adjust the departure times of the at least one train in the second set of trains; the second is to adjust the departure times of part of the trains in the second set of trains; and the third is to adjust the departure times of all the trains in the second set of trains.

Herein, under a condition that the difference between the departure time of the train $Sa_1$ and the first time is greater than or equal to the preset minimum departure time interval, it indicates that the differences between the departure times of adjacent trains in the second set of trains are all greater than or equal to the preset minimum departure time interval, and there is no need to adjust the departure times of all the trains in the second set of trains.

Under a condition that the difference between the departure time of the train $Sa_1$ and the first time is less than the preset minimum departure time interval, it indicates that the departure time of the train $Sa_1$ should be adjusted, and the departure time of the at least one train in the sorted second set of trains is adjusted in sequence based on the adjusted departure time of the train $Sa_1$.

According to the method for adjusting a train diagram provided by the embodiments of the present application, it is determined whether the difference between the departure time of the train $Sa_1$ and the first time satisfies the preset minimum departure time interval, the departure time of the at least one train in the sorted second set of trains is adjusted in sequence based on the result of the determining, and then the train diagram is adjusted, so that a one-button extra train adding function can be realized in the scenario with a large passenger flow, the work intensity of the staff is reduced, and the automation level is improved.

Based on the above embodiments, adjusting the departure time of the at least one train in the sorted second set of trains includes:

- calculating a second adjustment time of the train $Sa_1$ based on the preset minimum departure time interval;
- determining an adjusted departure time of the train $Sa_1$ based on the second adjustment time, and adjusting the first time based on the adjusted departure time of the train $Sa_1$; and
- adjusting the departure time of the at least one train in the sorted second set of trains in sequence based on the adjusted departure time of the train $Sa_1$.

In an implementation, calculating the second adjustment time of the train $Sa_1$ based on the preset minimum departure time interval includes:

- calculating the second adjustment time of the train $Sa_1$ based on the preset minimum departure time interval using Equation (9):

$$t'_{ad}=I-(t_{sa1}-T_0) \tag{9}$$

in which $t'_{ad}$ represents the second adjustment time, I represents the preset minimum departure time interval, $t_{sa1}$ represents the departure time of the train $Sa_1$, and $T_0$ represents the first time.

In an implementation, determining the adjusted departure time of the train $Sa_1$ based on the second adjustment time includes:

- determining the adjusted departure time of the train $Sa_1$ based on the second adjustment time using Equations (10)-(11):

$$N=\lceil t'_{ad}/(T_{urn}-T_{u\ min})\rceil \tag{10}$$

$$t'_{sa1}=t_{sa1}+N*(T_{urn}-T_{u\ min}) \tag{11}$$

in which $t'_{ad}$ represents the second adjustment time, N represents the number of train turn-backs, $T_{urn}$ represents the actual turn-back time of train, $T_{u\ min}$ represents the preset minimum turn-back time of train, $t_{sa1}$ represents the departure time of the train $Sa_1$, and $t'_{sa1}$ represents the adjusted departure time of the train $Sa_1$.

In an implementation, adjusting the first time based on the adjusted departure time of the train $Sa_1$ includes:

- calculating the adjusted first time based on the adjusted departure time of the train $Sa_1$ using Equation (8):

$$T'_0=t'_{sa1}-I \tag{8}$$

in which $T'_0$ represents the adjusted first time, $t'_{sa1}$ represents the adjusted departure time of the train $Sa_1$, and I represents the preset minimum departure time interval.

The departure time of the at least one train in the sorted second set of trains is adjusted in sequence means that the departure time of the at least one train in the second set of trains is adjusted according to the sort order of all the trains in the second set of trains.

According to the method for adjusting a train diagram provided by the embodiments of the present application, the adjusted departure time of the train $Sa_1$ is first calculated, then the first time is adjusted based on the adjusted departure time of the train $Sa_1$, and the departure time of the at least one train in the sorted second set of trains is adjusted in sequence based on the adjusted departure time of the train $Sa_1$, and then the train diagram is adjusted, so that a one-button extra train adding function can be realized in the scenario with a large passenger flow, the work intensity of the staff is reduced, and the automation level is improved.

Based on the above embodiments, adjusting the departure time of the at least one train in the sorted second set of trains in sequence based on the adjusted departure time of the train $Sa_1$ includes:

determining whether a difference between an adjusted departure time of a train $Sa_i$ and a departure time of a train $Sa_{i+1}$ is greater than or equal to the preset minimum departure time interval;

under a condition that the difference between the adjusted departure time of the train $Sa_i$ and the departure time of the train $Sa_{i+1}$ is greater than or equal to the preset minimum departure time interval, terminating the adjusting; and under a condition that the difference between the adjusted departure time of the train $Sa_i$ and the departure time of the train $Sa_{i+1}$ is less than the preset minimum departure time interval, adjusting the departure time of the train $Sa_{i+1}$.

The specific process for adjusting the departure time of the at least one train in the sorted second set of trains is described in conjunction with the following instance.

For example, after the departure time of the train $Sa_1$ is adjusted, it is determined whether a difference between the departure time of the train $Sa_2$ and the adjusted departure time of the train $Sa_1$ is greater than or equal to the preset minimum departure time interval, if yes, the adjusting for the departure time of the at least one train in the sorted second set of trains is stopped; and if no, the departure time of the train $Sa_2$ is adjusted, then it is further determined whether a difference between a departure time of a train $Sa_3$ and the adjusted departure time of the train $Sa_2$ is greater than or equal to the preset minimum departure time interval, until the adjusting for the departure time of the at least one train in the sorted second set of trains is stopped or the departure times of all the trains in the second set of trains have been adjusted.

In an implementation, adjusting the departure time of the train $Sa_i$ includes: adjusting the departure time of the train $Sa_i$ using Equation (12):

$$t'_{sai+1}=t'_{sai}+I \quad (12)$$

in which $t'_{sai}$ represents the adjusted departure time of the train $Sa_i$, $t'_{sai+1}$ a represents the adjusted departure time of the train $Sa_{i+1}$, and I represents the preset minimum departure time interval.

According to the method for adjusting a train diagram provided by the embodiments of the present application, the departure time of the at least one train in the sorted second set of trains is adjusted in sequence based on the adjusted departure time of the train $Sa_1$, and then the train diagram is adjusted, so that a one-button extra train adding function can be realized in the scenario with a large passenger flow, the work intensity of the staff is reduced, and the automation level is improved.

Figure 4:
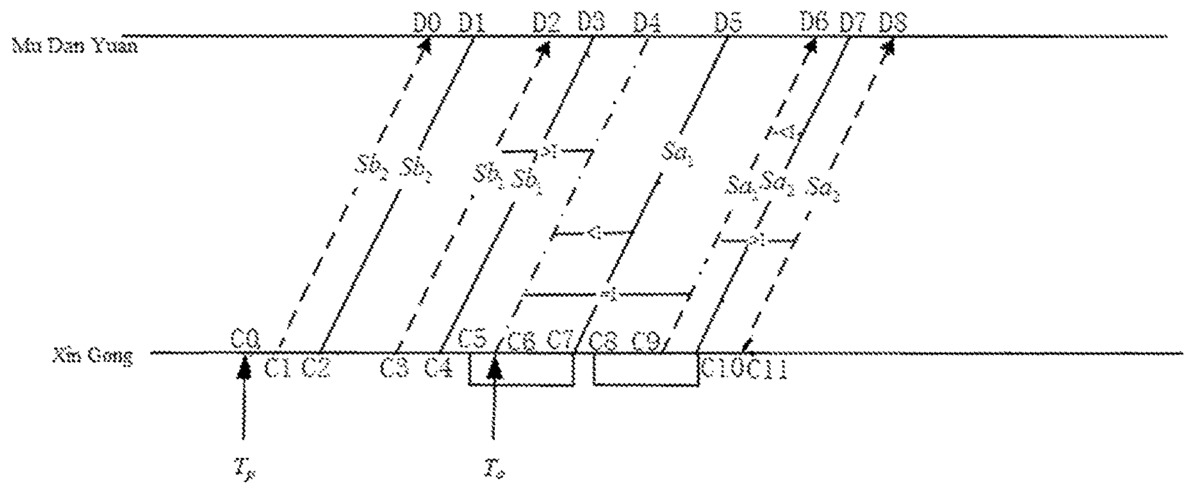
FIG. 4 shows another schematic scenario diagram of a method for adjusting a train diagram provided by the present application.

The process for adjusting the second set of trains under a condition that the departure time of the at least one train in the first set of trains has been adjusted is specifically described with reference to FIG. 4. FIG. 4 shows another schematic scenario diagram of a method for adjusting a train diagram provided by the embodiments of the present application.

As shown in FIG. 4, if the target passenger flow occurs, an extra train is added for the target passenger flow C0 represents the time node $T_p$ of a train with an adjustable departure time, the segment from C6 to D4 represents the first time $T_0$ of the extra train, in which $T_p=t_0+t_1+t_2$, the initial value of $T_0$ is $t_0+t_1+t_2+t_3+t_4$, $t_0$ represents the time when the target passenger flow occurs, $t_1$ represents the time when the adjusted train diagram is generate if the target passenger flow occurs, $t_2$ represents the time to when an extra train adding instruction is performed, $t_3$ represents the train preparation time, and $t_4$ represents the time when the extra train arrives at the starting station after receiving the instruction.

The current train diagram includes the first set of trains which includes a train $Sb_1$ and a train $Sb_2$, and a second set of trains which includes a train $Sa_1$ and a train $Sa_2$, Xin Gong represents the starting station, Mu Dan Yuan represents the final station, the segment from C2 to D1 represents the departure time of the train $Sb_2$, the segment from C4 to D3 represents the departure time of the train $Sb_1$, the segment from C7 to D5 represents the departure time $t_{sa1}$ of the train $Sa_1$, the segment from C10 to D7 represents the departure time $t_{sa2}$ of the train $Sa_2$, and both the segments from C5 to C7 and from C8 to C10 represent the actual up turn-back time of train $T_{urn}$.

As shown in FIG. 4, the segment from C3 to D2 represents the adjusted departure time of the train $Sb_i$ in the first set of trains, the segment from C1 to DO represents the adjusted departure time of the train $Sa_1$ in the second set of trains.

Adjusting the second set of trains under a condition that the departure time of the at least one train in the first set of trains has been adjusted includes:

under a condition that $t_{sa1}-T_0<I$, adjusting the departure time of the train $Sa_1$ in the second set of trains to obtain the adjusted departure time $t'_{sa1}$ of the train $Sa_1$, in which $t'_{sa1}$ satisfies $t'_{sa1}-T_0\geq I$, and I represents the preset minimum departure time interval; and under a condition that $t'_{sa1}-t_{sa2}<I$, adjusting the departure time of the train $Sa_2$ in the second set of trains to obtain the adjusted departure time $t'_{sa2}$ of the train $Sa_2$.

As shown in FIG. 4, the adjusted train diagram includes the first set of trains which includes a train $Sb_1$ and a train $Sb_2$, and a second set of trains which includes a train $Sa_1$ and a train $Sa_2$, in which the segment from C3 to D2 represents the adjusted departure time of the train $Sb_1$, the segment from C1 to DO represents the adjusted departure time of the train $Sb_2$, the segment from C9 to D6 represents the adjusted departure time of the train $Sa_1$, and the segment from C11 to D8 represents the adjusted departure time of the train $Sa_2$.

Figure 5:
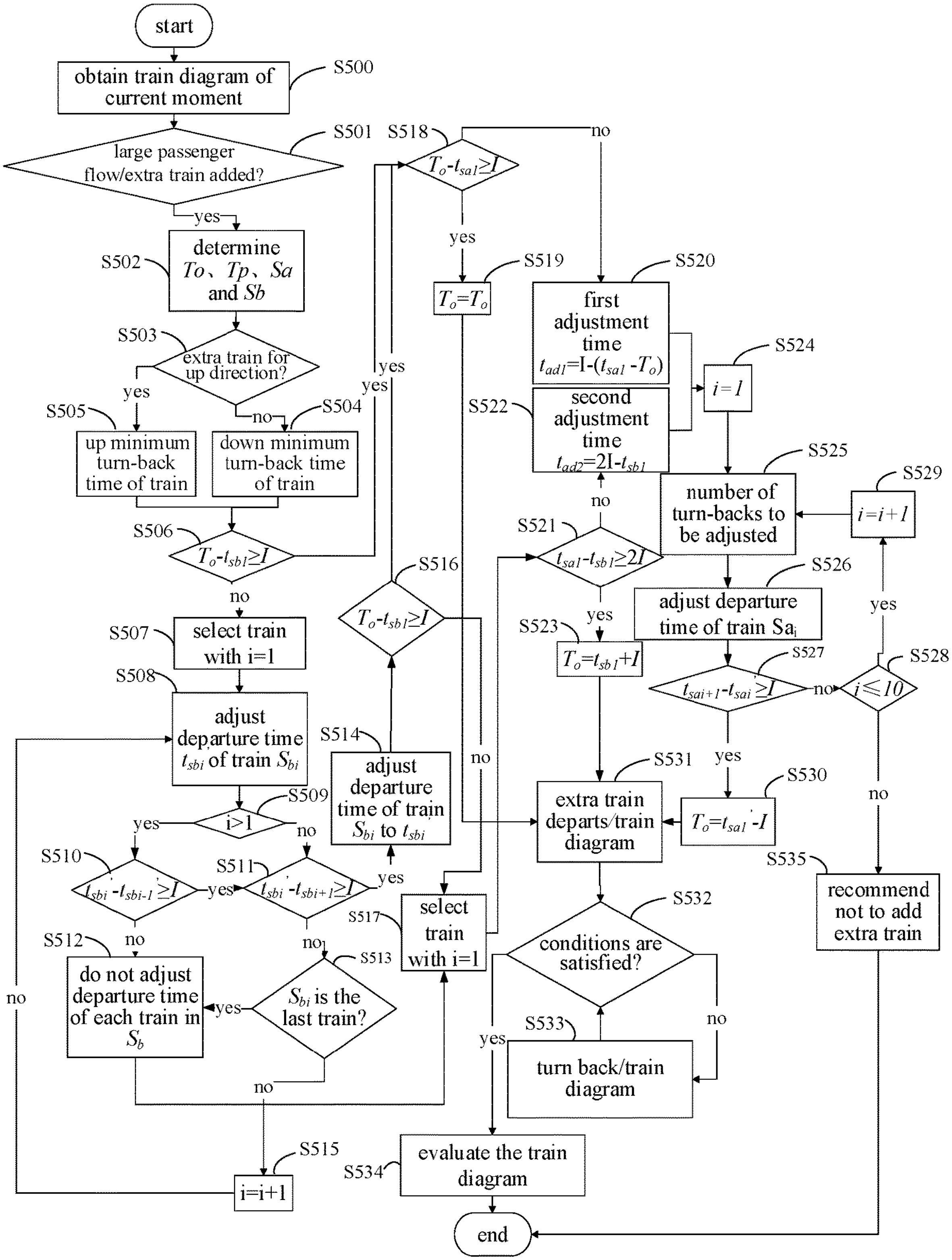
FIG. 5 shows another schematic flow diagram of a method for adjusting a train diagram provided by the present application.

The flow of the method for adjusting the train diagram is specifically described with reference to FIG. 5. FIG. 5 shows another schematic flow diagram of a method for adjusting a train diagram provided by the embodiments of the present application. As shown in FIG. 5, the method includes the following steps:

S500: obtaining the train diagram of the current moment;

S501: determining whether the current moment is associated with a scenario in which a large passenger flow occurs and an extra train will be added, if yes, proceeding to S502, and if no, terminating the adjusting;

S502: determining the first time $T_0$, the time node $T_p$ of a train with an adjustable departure time, the sorted first set of trains Sb and the sorted second set of trains Sa according to the extra train, in which $T_p<T_0$;

S503: determining, for the train diagram of the current moment, whether the extra train is added for the up direction, if yes, proceeding to S505, and if no, proceeding to S504;

S504: using the down minimum turn-back time of train $T_{u\,min}$, then proceeding to S506;

S505: using the up minimum turn-back time of train $T_{u\,min}$, then proceeding to S506;

S506: determining, for the train, whether $T_0-t_{sb1}\geq I$, in which $t_{sb1}$ is the departure time of the train $Sb_1$ and I is the preset minimum departure time interval, if yes, proceeding to S518, and if no, proceeding to S507;

S507: selecting the train with i=1 from Sb, that is the train $Sb_1$, then proceeding to S508;

S508: adjusting the departure time $t'_{sbi}$ of the train $Sb_i$ according to $T_{u\ min}$, then proceeding to S509;

S509: determining whether i>1, if yes, proceeding to S510, and if no, proceeding to S511;

S510: determining whether $t'_{sbi}-t'_{sbi-1}\geq I$, if yes, proceeding to S511, and if no, proceeding to S512;

S511: determining whether $t'_{sbi}-t_{sbi+1}\geq I$, if yes, proceeding to S514, and if no, proceeding to S513;

S512: do not adjust the departure time of each train in Sb, then proceeding to S517;

S513: determining whether the train $Sb_i$ is the last train in Sb, if yes, proceeding to S512, and if no, proceeding to S515;

S514: adjusting the departure time of the train $Sb_i$ to $t'_{sbi}$, performing $t_{sbi}=t'_{sbi}$, then proceeding to S516;

S515: performing i=i+1, then proceeding to S508;

S516: determining whether $T_0-t_{sb1}\geq I$, if yes, proceeding to S518, and if no, proceeding to S517;

S517: selecting the train with i=1 from Sa, that is the train $Sa_1$, then proceeding to S521;

S518: determining whether $T_0-t_{sa1}\geq I$, in which $t_{sa1}$ represents the departure time of the train $Sa_1$, if yes, proceeding to S519, and if no, proceeding to S520;

S519: performing $T_0=T_0$, then proceeding to S531;

S520: calculating the first adjustment time $t_{ad1}=I-(t_{sa1}-T_0)$ of the train $Sa_1$, then proceeding to S524;

S521: determining whether $t_{sa1}-t_{sb1}\leq 2I$, if yes, proceeding to S523, and if no, proceeding to S522;

S522: calculating the second adjustment time $t_{ad2}=2I-t_{sb1}$ of the train $Sa_1$, then proceeding to S524;

S523: performing $T_0=t_{sb1}+I$, then proceeding to S531;

S524: performing i=1, that is the train $Sa_1$, then proceeding to S525;

S525: calculating the number of turn-backs $N=t_{ad}/(T_{urn}-T_{u\ min})$ that needs to be adjusted for the train $Sa_i$, in which $t_{ad}$ may be $t_{ad1}$ or $t_{ad2}$, $T_{urn}$ represents the actual turn-back time of train, then proceeding to S526;

S526: adjusting the departure time of the train $Sa_i$, then proceeding to S527;

S527: determining whether $t_{sai+1}-t'_{sai}\geq I$, if yes, proceeding to S530, and if no, proceeding to S528;

S528: determining whether i≤10, if yes, proceeding to S529, and if no, proceeding to S535;

S529: performing i=i+1, then proceeding to S525;

S530: performing $T_0=t'_{sa1}-I$, then proceeding to S531;

S531: the extra bus added for the large passenger flow departing at $T_0$, and drawing the train diagram, then proceeding to S532;

S532: determining whether conditions for exiting the service are satisfied after the train arriving at the final station, if yes, proceeding to S534, and if no, proceeding to S533;

S533: the extra train turning back according to the actual turn-back time of the train $Sb_1$, and drawing the train diagram, then proceeding to S532;

S534: evaluating the train diagram using the parallel deduction system, terminating the service;

S535: recommending not to add an extra train in the current scenario, terminating the service.

An apparatus for adjusting a train diagram provided by the present application is described below, and the apparatus for adjusting a train diagram described blow and the method of adjusting a train diagram described above may refer to each other.

Figure 6:
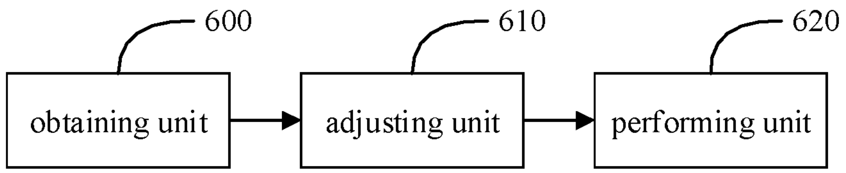
FIG. 6 shows a schematic structural diagram of an apparatus for adjusting a train diagram provided by the present application.

FIG. 6 shows a schematic structural diagram of an apparatus for adjusting a train diagram provided by the embodiments of the present application. As shown in FIG. 6, the apparatus for adjusting a train diagram includes an obtaining unit 600, an adjusting unit 610 and a performing unit 620, in which:

the obtaining unit 600 is configured to obtain a first time of an extra train corresponding to a target passenger flow and obtain a set of trains with adjustable departure times based on the first time, in which the set of trains includes at least one train;

the adjusting unit 610 is configured to adjust a departure time of the at least one train in the set of trains based on a preset minimum departure time interval to obtain an adjusted train diagram; and the performing unit 620 is configured to perform an extra train adding instruction based on the adjusted train diagram.

According to the apparatus for adjusting a train diagram provided by the embodiments of the present application, the first time of the extra train corresponding to the target passenger flow is obtained, and the set of trains with adjustable departure times is obtained based on the first time, the departure time of the at least one train in the set of trains is adjusted based on the preset minimum departure time interval to obtain the adjusted train diagram, and the extra train adding instruction is performed based on the adjusted train diagram, so that a one-button extra train adding function can be realized in the scenario with a large passenger flow, the work intensity of the staff is reduced, and the automation level is improved.

Optionally, the set of trains includes a first set of trains and a second set of trains, the first set of trains includes at least one train with a departure time before the first time, and the second set of trains includes at least one train with a departure time after the first time; the adjusting unit 610 is configured to sort the at least one train in the first set of trains in an order of departure time from back to front to obtain a sorted first set of trains $\{Sb_1, \ldots, Sb_i, \ldots, Sb_n\}$, in which $1\leq i\leq n$, and i is an integer;

determine whether a difference between the first time and a departure time of a train $Sb_1$ is greater than or equal to the preset minimum departure time interval;

under a condition that the difference between the first time and the departure time of the train $Sb_1$ is greater than or equal to the preset minimum departure time interval, adjust the departure time of the at least one train in the second set of trains based on the preset minimum departure time interval; and under a condition that the difference between the first time and the departure time of the train $Sb_1$ is less than the preset minimum departure time interval, adjust the departure time of the at least one train in the sorted first set of trains in sequence based on a preset minimum turn-back time of train.

Optionally, adjusting the departure time of the at least one train in the sorted first set of trains in sequence based on the preset minimum turn-back time of train includes: each time a departure time of a train $Sb_i$ is adjusted, determining whether an adjusted departure time of the train $Sb_i$ satisfies a first preset condition;

under a condition that the adjusted departure time of the train $Sb_i$ satisfies the first preset condition, stopping adjusting the departure time of the at least one train in the sorted first set of trains, and determining whether a difference between the first time and the adjusted departure time of the train $Sb_1$ is greater than or equal to the preset minimum departure time interval; and under a condition that the adjusted departure time of the train $Sb_i$ does not satisfy the first preset condition, proceeding to adjust a departure time of a train $Sb_{i+1}$ in the first set of trains; in which the first preset condition is: $t'_{sbi}-t_{sbi+1}\geq I$ and $t'_{sbi-1}-t'_{sbi}\geq I$, $t_{sbi-1}$ represents an adjusted departure time of a train $Sb_{i-1}$, $t'_{sbi}$ represents the adjusted departure time of the train $Sb_i$, I represents the preset minimum departure time interval, and $t_{sbi+1}$ represents the departure time of the train $Sb_{i+1}$.

Optionally, after it is determined whether the adjusted departure time of the train $Sb_i$ satisfies the first preset condition, the following steps are performed:

under a condition that a difference between an adjusted departure time of a train $Sb_{n-1}$ and an adjusted departure time of a train $Sb_n$ is less than the preset minimum departure time interval, adjusting the first time based on the preset minimum departure time interval without adjusting departure times of all trains in the sorted first set of trains.

Optionally, after it is determined whether the difference between the first time and the adjusted departure time of the train $Sb_1$ is greater than or equal to the preset minimum departure time interval, the following steps are performed:

under a condition that the difference between the first time and the adjusted departure time of the train $Sb_1$ is greater than or equal to the preset minimum departure time interval, adjusting the departure time of the at least one train in the second set of trains based on the preset minimum departure time interval; and under a condition that the difference between the first time and the adjusted departure time of the train $Sb_1$ is less than the preset minimum departure time interval, adjusting the first time based on the preset minimum departure time interval.

Optionally, adjusting the first time based on the preset minimum departure time interval includes:

sorting the at least one train in the second set of trains in an order of departure time from front to back to obtain a sorted second set of trains $\{Sa_1, \ldots, Sa_i, \ldots, Sa_n\}$, in which $1\leq i\leq n$, and i is an integer;

determining whether a difference between a departure time of a train $Sa_1$ and the departure time of the train $Sb_1$ is greater than or equal to twice the preset minimum departure time interval, or determining whether a difference between the departure time of the train $Sa_1$ and the adjusted departure time of the train $Sb_1$ is greater than or equal to twice the preset minimum departure time interval; and under a condition that the difference between the departure time of the train $Sa_1$ and the departure time of the train $Sb_1$ is greater than or equal to twice the preset minimum departure time interval, or it is determined that the difference between the departure time of the train $Sa_1$ and the adjusted departure time of the train $Sb_1$ is greater than or equal to twice the preset minimum departure time interval, adjusting the first time based on the preset minimum departure time interval, and terminating the adjusting.

Optionally, adjusting the first time based on the preset minimum departure time interval further includes:

under a condition that the difference between the departure time of the train $Sa_1$ and the departure time of the train $Sb_1$ is less than twice the preset minimum departure time interval, or it is determined that the difference between the departure time of the train $Sa_1$ and the adjusted departure time of the train $Sb_1$ is less than twice the preset minimum departure time interval, adjusting the departure time of the at least one train in the sorted second set of trains based on the preset minimum departure time interval;

in which adjusting the departure time of the at least one train in the sorted second set of trains based on the preset minimum departure time interval includes:

calculating a first adjustment time of the train $Sa_1$ based on the preset minimum departure time interval, determining an adjusted departure time of the train $Sa_1$ based on the first adjustment time of the train $Sa_1$, and adjusting the first time based on the adjusted departure time of the train $Sa_1$; and adjusting the departure time of the at least one train in the sorted second set of trains in sequence based on the adjusted departure time of the train $Sa_1$.

Optionally, adjusting the departure time of the at least one train in the second set of trains based on the preset minimum departure time interval includes:

sorting the at least one train in the second set of trains in an order of departure time from front to back to obtain a sorted second set of trains $\{Sa_1, \ldots, Sa_i, \ldots, Sa_n\}$, in which $1\leq i\leq n$, and i is an integer;

determining whether a difference between a departure time of a train $Sa_1$ and the first time is greater than or equal to the preset minimum departure time interval;

under a condition that the difference between the departure time of the train $Sa_1$ and the first time is greater than or equal to the preset minimum departure time interval, terminating the adjusting; and under a condition that the difference between the departure time of the train $Sa_1$ and the first time is less than the preset minimum departure time interval, adjusting the departure time of the at least one train in the sorted second set of trains.

Optionally, adjusting the departure time of the at least one train in the sorted second set of trains includes:

calculating a second adjustment time of the train $Sa_1$ based on the preset minimum departure time interval;

determining an adjusted departure time of the train $Sa_1$ based on the second adjustment time, and adjusting the first time based on the adjusted departure time of the train $Sa_1$; and adjusting the departure time of the at least one train in the sorted second set of trains in sequence based on the adjusted departure time of the train $Sa_1$.

Optionally, adjusting the departure time of the at least one train in the sorted second set of trains in sequence based on the adjusted departure time of the train $Sa_1$ includes:

determining whether a difference between an adjusted departure time of a train $Sa_i$ and a departure time of a train $Sa_{i+1}$ is greater than or equal to the preset minimum departure time interval;

under a condition that the difference between the adjusted departure time of the train $Sa_i$ and the departure time of the train $Sa_{i+1}$ is greater than or equal to the preset minimum departure time interval, terminating the adjusting; and under a condition that the difference between the adjusted departure time of the train $Sa_i$ and the departure time of the train $Sa_{i+1}$ is less than the preset minimum departure time interval, adjusting the departure time of the train $Sa_{i+1}$.

The apparatus for adjusting a train diagram provided by the present application can implement the various processes implemented by the method embodiments of FIGS. 1 to 5 and achieve the same technical effects, which are omitted here to avoid repetition.

Figure 7:
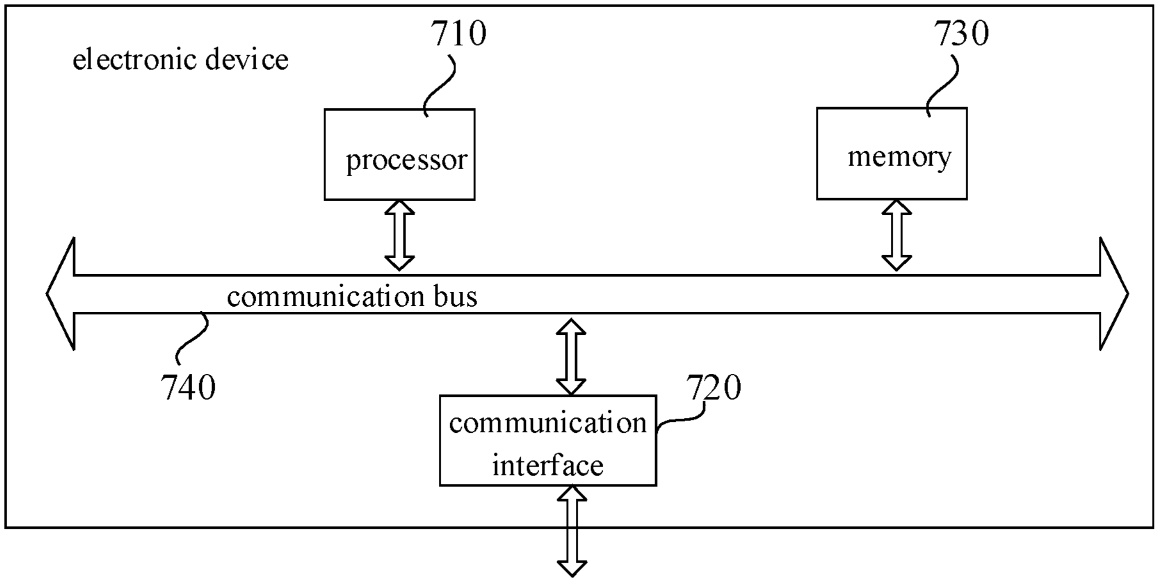
FIG. 7 shows a schematic structural diagram of an electronic device provided by the present application.

FIG. 7 shows a schematic structural diagram of an electronic device provided by the present application. As shown in FIG. 7, the electronic device may include: a processor 710, a communication interface 720, a memory 730, and a communication bus 740, in which the processor 710, the communication interface 720, and the memory 730 communicate with each other via the communication bus 740. The processor 710 may call the logic instructions in the memory 730 to perform a method for adjusting a train diagram, and the method includes:

obtaining a first time of an extra train corresponding to a target passenger flow, and obtaining a set of trains with adjustable departure times based on the first time, in which the set of trains includes at least one train;

adjusting a departure time of the at least one train in the set of trains based on a preset minimum departure time interval to obtain an adjusted train diagram; and performing an extra train adding instruction based on the adjusted train diagram.

Further, the above-mentioned logical instructions in the memory 730 can be implemented in the form of a software functional unit and can be stored in a computer readable storage medium when sold or used as an independent product. With this understanding, the essential or the part that contributes to the prior art of the technical solutions of the present application or a part of the technical solutions can be embodied in the form of a software product, which is stored in a storage medium and includes several instructions used to cause a computer device (which may be a personal computer, a server, or a network device, etc.) to execute all or part of the steps of the methods described in the various embodiments of the present application. The aforementioned storage media include: USB flash disk, mobile hard disk, read-only memory (Read-Only Memory, ROM), random access memory (Random Access Memory, RAM), diskettes or optical disks, and other media that can store program codes.

In another aspect, the present application further provides a computer program product including a computer program stored on a non-transitory computer-readable storage medium, the computer program includes program instructions, and a computer, when executing the program instructions, performs the method for adjusting a train diagram provided by the above various embodiments, and the method includes:

obtaining a first time of an extra train corresponding to a target passenger flow, and obtaining a set of trains with adjustable departure times based on the first time, in which the set of trains includes at least one train;

adjusting a departure time of the at least one train in the set of trains based on a preset minimum departure time interval to obtain an adjusted train diagram; and performing an extra train adding instruction based on the adjusted train diagram.

In yet another aspect, the present application further provides a non-transitory computer readable storage medium storing a computer program thereon which, when performed by a processor, implements steps of the method for adjusting a train diagram provided by the above various embodiments, and the method includes:

obtaining a first time of an extra train corresponding to a target passenger flow, and obtaining a set of trains with adjustable departure times based on the first time, in which the set of trains includes at least one train;

adjusting a departure time of the at least one train in the set of trains based on a preset minimum departure time interval to obtain an adjusted train diagram; and performing an extra train adding instruction based on the adjusted train diagram.

The apparatus embodiments described above are merely illustrative, in which the units described as separate components may or may not be physically separated, and the components displayed as units may or may not be physical units, that is, they can be located in one place or distributed to a plurality of network units. Some or all of the modules can be selected according to actual needs to achieve the objectives of the technical solutions of the embodiments. Those of ordinary skill in the art can understand and implement the embodiments without creative work.

With the description of the above implementations, those skilled in the art can clearly understand that each implementation can be implemented by means of software together with necessary general hardware platforms, and of course, each implementation can also be implemented by hardware. With this understanding, the essential or the part that contributes to the prior art of the above technical solutions can be embodied in the form of a software product which can be stored in a computer-readable storage medium, such as ROM/RAM, diskettes, an optical disc, and includes several instructions used to cause a computer device (which may be a personal computer, a server, or a network device, etc.) to execute the methods described in each embodiment or some parts of the embodiments.

Finally, it should be noted that the above embodiments are only used to illustrate the technical solutions of the present application, rather than to limit them. Although the present application has been described in detail with reference to the foregoing embodiments, those of ordinary skill in the art should understand that the technical solutions described in the foregoing embodiments can be modified or some of the technical features thereof can be equivalently replaced, and these modifications or replacements do not cause the essential of the corresponding technical solutions to deviate from the gist and scope of the technical solutions of the various embodiments of the present application.

What is claimed is:

1. A method for adjusting a train diagram, comprising:

obtaining a first time of an extra train corresponding to a target passenger flow, and obtaining a set of trains with adjustable departure times based on the first time, wherein the set of trains comprises at least one train;

adjusting a departure time of the at least one train in the set of trains based on a preset minimum departure time interval to obtain an adjusted train diagram; and performing an extra train adding instruction based on the adjusted train diagram;

wherein the set of trains comprises a first set of trains and a second set of trains, the first set of trains comprises at least one train with a departure time before the first time, and the second set of trains comprises at least one train with a departure time after the first time;

adjusting the departure time of the at least one train in the set of trains based on the preset minimum departure time interval comprises:

sorting the at least one train in the first set of trains in an order of departure time from back to front to obtain a sorted first set of trains $\{Sb_1 \ldots, Sb_i, \ldots Sb_n\}$, wherein $1 \leq i \leq n$ and i is an integer;

determining whether a difference between the first time and a departure time of a train $Sb_1$ is greater than or equal to the preset minimum departure time interval;

under a condition that the difference between the first time and the departure time of the train $Sb_1$ is greater than or equal to the preset minimum departure time interval, adjusting the departure time of the at least one train in the second set of trains based on the preset minimum departure time interval; and under a condition that the difference between the first time and the departure time of the train $Sb_1$ is less than the preset minimum departure time interval, adjusting the departure time of the at least one train in the sorted first set of trains in sequence based on a preset minimum turn-back time of train.

2. The method for adjusting a train diagram of claim 1, wherein adjusting the departure time of the at least one train in the sorted first set of trains in sequence based on the preset minimum turn-back time of train comprises:

each time a departure time of a train $Sb_i$ is adjusted, determining whether an adjusted departure time of the train $Sb_1$ satisfies a first preset condition;

under a condition that the adjusted departure time of the train $Sb_i$ satisfies the first preset condition, stopping adjusting the departure time of the at least one train in the sorted first set of trains, and determining whether a difference between the first time and the adjusted departure time of the train $Sb_1$ is greater than or equal to the preset minimum departure time interval; and under a condition that the adjusted departure time of the train $Sb_i$ does not satisfy the first preset condition, proceeding to adjust a departure time of a train $Sb_{i+1}$ in the first set of trains;

wherein the first preset condition is: $t_{sbi}-t_{sbi+1}\geq I$ and $t_{sbi-1}-t_{sbi}\geq I$, $t_{sbi-1}$ represents an adjusted departure time of a train $Sb_{i-1}$, $t_{sbi}$ represents the adjusted departure time of the train $Sb_i$, I represents the preset minimum departure time interval, and $t_{sbi+1}$ represents the departure time of the train $Sb_{i+1}$.

3. The method for adjusting a train diagram of claim 2, wherein after determining whether the adjusted departure time of the train $Sb_i$ satisfies the first preset condition, the method further comprises:

under a condition that a difference between an adjusted departure time of a train $Sb_{n-1}$ and an adjusted departure time of a train $Sb_n$ is less than the preset minimum departure time interval, adjusting the first time based on the preset minimum departure time interval without adjusting departure times of all trains in the sorted first set of trains.

4. The method for adjusting a train diagram of claim 3, wherein adjusting the first time based on the preset minimum departure time interval comprises:

sorting the at least one train in the second set of trains in an order of departure time from front to back to obtain a sorted second set of trains $\{Sa_1, \ldots, Sa_i, \ldots, Sa_n\}$, wherein $1\geq i\geq n$, and i is an integer;

determining whether a difference between a departure time of a train $Sa_1$ and the departure time of the train $Sb_1$ is greater than or equal to twice the preset minimum departure time interval, or determining whether a difference between the departure time of the train $Sa_1$ and the adjusted departure time of the train $Sb_1$ is greater than or equal to twice the preset minimum departure time interval; and under a condition that the difference between the departure time of the train $Sa_1$ and the departure time of the train $Sb_1$ is greater than or equal to twice the preset minimum departure time interval, or it is determined that the difference between the departure time of the train $Sa_1$ and the adjusted departure time of the train $Sb_1$ is greater than or equal to twice the preset minimum departure time interval, adjusting the first time based on the preset minimum departure time interval, and terminating the adjusting.

5. The method for adjusting a train diagram of claim 4, further comprising:

under a condition that the difference between the departure time of the train $Sa_1$ and the departure time of the train $Sb_1$ is less than twice the preset minimum departure time interval, or it is determined that the difference between the departure time of the train $Sa_1$ and the adjusted departure time of the train $Sb_1$ is less than twice the preset minimum departure time interval, adjusting the departure time of the at least one train in the sorted second set of trains based on the preset minimum departure time interval;

wherein adjusting the departure time of the at least one train in the sorted second set of trains based on the preset minimum departure time interval comprises:

calculating a first adjustment time of the train $Sa_1$ based on the preset minimum departure time interval, determining an adjusted departure time of the train $Sa_1$ based on the first adjustment time of the train $Sa_1$, and adjusting the first time based on the adjusted departure time of the train $Sa_1$; and adjusting the departure time of the at least one train in the sorted second set of trains in sequence based on the adjusted departure time of the train $Sa_1$.

6. The method for adjusting a train diagram of claim 5, wherein adjusting the departure time of the at least one train in the sorted second set of trains in sequence based on the adjusted departure time of the train $Sa_i$ comprises:

determining whether a difference between an adjusted departure time of a train Sat and a departure time of a train $Sa_{i+1}$ is greater than or equal to the preset minimum departure time interval;

under a condition that the difference between the adjusted departure time of the train $Sa_i$ and the departure time of the train $Sa_{i+1}$ is greater than or equal to the preset minimum departure time interval, terminating the adjusting; and under a condition that the difference between the adjusted departure time of the train $Sa_i$ and the departure time of the train $Sa_{i+1}$ is less than the preset minimum departure time interval, adjusting the departure time of the train $Sa_{i+1}$.

7. The method for adjusting a train diagram of claim 2, wherein after determining whether the difference between the first time and the adjusted departure time of the train $Sb_1$ is greater than or equal to the preset minimum departure time interval, the method further comprises:

under a condition that the difference between the first time and the adjusted departure time of the train $Sb_1$ is greater than or equal to the preset minimum departure time interval, adjusting the departure time of the at least one train in the second set of trains based on the preset minimum departure time interval; and under a condition that the difference between the first time and the adjusted departure time of the train $Sb_1$ is less than the preset minimum departure time interval, adjusting the first time based on the preset minimum departure time interval.

8. The method for adjusting a train diagram of claim 7, wherein adjusting the first time based on the preset minimum departure time interval comprises:

sorting the at least one train in the second set of trains in an order of departure time from front to back to obtain a sorted second set of trains $\{Sa_1, \ldots, Sa_i, \ldots, Sa_n\}$, wherein 1≥i≥n, and i is an integer;

determining whether a difference between a departure time of a train $Sa_1$ and the departure time of the train $Sb_1$ is greater than or equal to twice the preset minimum departure time interval, or determining whether a difference between the departure time of the train $Sa_1$ and the adjusted departure time of the train $Sb_1$ is greater than or equal to twice the preset minimum departure time interval; and under a condition that the difference between the departure time of the train $Sa_1$ and the departure time of the train $Sb_1$ is greater than or equal to twice the preset minimum departure time interval, or it is determined that the difference between the departure time of the train $Sa_1$ and the adjusted departure time of the train $Sb_1$ is greater than or equal to twice the preset minimum departure time interval, adjusting the first time based on the preset minimum departure time interval, and terminating the adjusting.

9. The method for adjusting a train diagram of claim 7, wherein adjusting the departure time of the at least one train in the second set of trains based on the preset minimum departure time interval comprises:

sorting the at least one train in the second set of trains in an order of departure time from front to back to obtain a sorted second set of trains $\{Sa_1, \ldots, Sa_i, \ldots, Sa_n\}$, wherein 1≥i≥n, and i is an integer;

determining whether a difference between a departure time of a train $Sa_1$ and the first time is greater than or equal to the preset minimum departure time interval;

under a condition that the difference between the departure time of the train $Sa_1$ and the first time is greater than or equal to the preset minimum departure time interval, terminating the adjusting; and under a condition that the difference between the departure time of the train $Sa_1$ and the first time is less than the preset minimum departure time interval, adjusting the departure time of the at least one train in the sorted second set of trains.

10. The method for adjusting a train diagram of claim 1, wherein adjusting the departure time of the at least one train in the second set of trains based on the preset minimum departure time interval comprises:

sorting the at least one train in the second set of trains in an order of departure time from front to back to obtain a sorted second set of trains $\{Sa_1, \ldots, Sa_i, \ldots, Sa_n\}$, wherein 1≥i≥n, and i is an integer;

determining whether a difference between a departure time of a train $Sa_1$ and the first time is greater than or equal to the preset minimum departure time interval;

under a condition that the difference between the departure time of the train $Sa_1$ and the first time is greater than or equal to the preset minimum departure time interval, terminating the adjusting; and under a condition that the difference between the departure time of the train $Sa_1$ and the first time is less than the preset minimum departure time interval, adjusting the departure time of the at least one train in the sorted second set of trains.

11. The method for adjusting a train diagram of claim 10, wherein adjusting the departure time of the at least one train in the sorted second set of trains comprises:

calculating a second adjustment time of the train $Sa_1$ based on the preset minimum departure time interval;

determining an adjusted departure time of the train $Sa_1$ based on the second adjustment time, and adjusting the first time based on the adjusted departure time of the train $Sa_1$; and adjusting the departure time of the at least one train in the sorted second set of trains in sequence based on the adjusted departure time of the train $Sa_1$.

12. The method for adjusting a train diagram of claim 11, wherein adjusting the departure time of the at least one train in the sorted second set of trains in sequence based on the adjusted departure time of the train $Sa_1$ comprises:

determining whether a difference between an adjusted departure time of a train $Sa_i$ and a departure time of a train $Sa_{i+1}$ is greater than or equal to the preset minimum departure time interval;

under a condition that the difference between the adjusted departure time of the train $Sa_i$ and the departure time of the train $Sa_{i+1}$ is greater than or equal to the preset minimum departure time interval, terminating the adjusting; and under a condition that the difference between the adjusted departure time of the train $Sa_i$ and the departure time of the train $Sa_{i+1}$ is less than the preset minimum departure time interval, adjusting the departure time of the train $Sa_{i+1}$.

* * * * *